United States Patent
Nakano et al.

(10) Patent No.: US 9,610,932 B2
(45) Date of Patent: Apr. 4, 2017

(54) BRAKE CONTROL APPARATUS

(71) Applicant: Hitachi Automotive Systems, Ltd., Hitachinaka-shi, Ibaraki (JP)

(72) Inventors: Kazuhiko Nakano, Isesaki (JP); Hirofumi Watanabe, Isesaki (JP); Daisuke Yasukawa, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 279 days.

(21) Appl. No.: 14/472,518

(22) Filed: Aug. 29, 2014

(65) Prior Publication Data
US 2015/0075156 A1    Mar. 19, 2015

(30) Foreign Application Priority Data

Sep. 19, 2013   (JP) ................................ 2013-194163

(51) Int. Cl.
*B60T 13/74*    (2006.01)
*B60T 11/10*    (2006.01)

(52) U.S. Cl.
CPC ........... *B60T 13/745* (2013.01); *B60T 11/103* (2013.01)

(58) Field of Classification Search
CPC .............................. B60T 11/103; B60T 13/745
See application file for complete search history.

(56) References Cited

U.S. PATENT DOCUMENTS

| | | | |
|---|---|---|---|
| 6,352,317 B1 | 3/2002 | Blazic et al. | |
| 7,361,844 B2 * | 4/2008 | Vinciarelli | H05K 1/141 174/252 |
| 8,130,493 B2 * | 3/2012 | Na | H05K 1/0203 165/185 |
| 8,387,381 B2 * | 3/2013 | Ohno | B60T 13/745 60/545 |
| 8,708,429 B2 | 4/2014 | Maury et al. | |

(Continued)

FOREIGN PATENT DOCUMENTS

| | | |
|---|---|---|
| JP | 11-89248 A | 3/1999 |
| JP | 2000-516559 A | 12/2000 |

(Continued)

OTHER PUBLICATIONS

Japanese-language Office Action issued in counterpart Japanese Application No. 2013-194163 dated Nov. 1, 2016 (3 pages).

*Primary Examiner* — Logan Kraft
(74) *Attorney, Agent, or Firm* — Crowell & Moring LLP

(57) ABSTRACT

Disclosed is a brake control apparatus including a master cylinder that generates a hydraulic braking pressure in response to operation of a brake pedal, an electric motor that drives the master cylinder, a housing in which the master cylinder and the electric motor are assembled, and a control unit adapted to perform drive control of the electric motor. The control unit has a bottom formed at least partially integral with the housing and includes a circuit board mounting thereon drive elements to drive the electric motor. The brake control apparatus includes a heat radiating seat located on an inner surface of the bottom of the control unit at a position apart from the electric motor and closer to the master cylinder than the electric motor and brought into thermal contact with the circuit board so as to radiate heat of the drive elements toward the housing.

6 Claims, 8 Drawing Sheets

(56) References Cited

U.S. PATENT DOCUMENTS

| | | | |
|---|---|---|---|
| 8,959,908 B2* | 2/2015 | Kikuchi | ............... B60T 8/368 60/538 |
| 2011/0254362 A1 | 10/2011 | Maury et al. | |
| 2011/0259005 A1 | 10/2011 | Kikuchi et al. | |
| 2013/0192222 A1 | 8/2013 | Nomura et al. | |

FOREIGN PATENT DOCUMENTS

| | | |
|---|---|---|
| JP | 2010-132102 A | 6/2010 |
| JP | 2011-219079 A | 11/2011 |
| JP | 2011-238850 A | 11/2011 |
| JP | 2013-69737 A | 4/2013 |
| JP | 2013-154842 A | 8/2013 |

* cited by examiner

BRAKE CONTROL APPARATUS

BACKGROUND OF THE INVENTION

The present invention relates to a brake control apparatus for controlling an actuator in an automotive brake system.

Japanese Laid-Open Patent Publication No. 2011-219079 discloses, as an example of a brake control apparatus for controlling an actuator in an automotive brake system, a hydraulic brake assembly having a master cylinder driven by an electric motor under the control of a control unit. In this conventional brake control apparatus, the control unit is arranged adjacent to the electric motor. Due to such arrangement, there arise the problems of upsizing of the brake control apparatus and poor heat radiation performance and vibration resistance of the control unit.

SUMMARY OF THE INVENTION

The present invention has been made in view of the above problems. It is accordingly an object of the present invention to provide a brake control apparatus with an electric motor and a control unit so as to, while being downsized, improve the heat radiation performance and vibration resistance of the control unit.

According to one aspect of the present invention, there is provided a brake control apparatus, comprising: a master cylinder that generates a hydraulic braking pressure in response to operation of a brake pedal; an electric motor that drives the master cylinder; a housing in which the master cylinder and the electric motor are assembled; and a control unit adapted to perform drive control of the electric motor, wherein the control unit has a bottom formed at least partially integral with the housing and comprises a circuit board mounting thereon drive elements to drive the electric motor; and wherein the brake control apparatus comprises a heat radiating seat located on the bottom of the control unit at a position apart from the electric motor and closer to the master cylinder than the electric motor and brought into thermal contact with the circuit board so as to radiate heat of the drive elements toward the housing.

In the present invention, the heat radiating seat is located on the side of the housing at the position apart from the electric motor and closer to the master cylinder than the electric motor within the control unit such that the drive element of the circuit board is in thermal contact with the housing through the heat radiating seat. The drive elements can be thus prevented from being influenced by vibrations from the electric motor. Further, heat of the drive elements can be readily released toward the housing. It is therefore possible in the present invention to improve the heat radiation performance and vibration resistance of the control unit while downsizing the brake control apparatus.

The other objects and features of the present invention will also become understood from the following description.

DESCRIPTIONS OF THE EMBODIMENTS

Hereinafter, one embodiment of the present invention will be described below with reference to the drawings.

Figure 1:
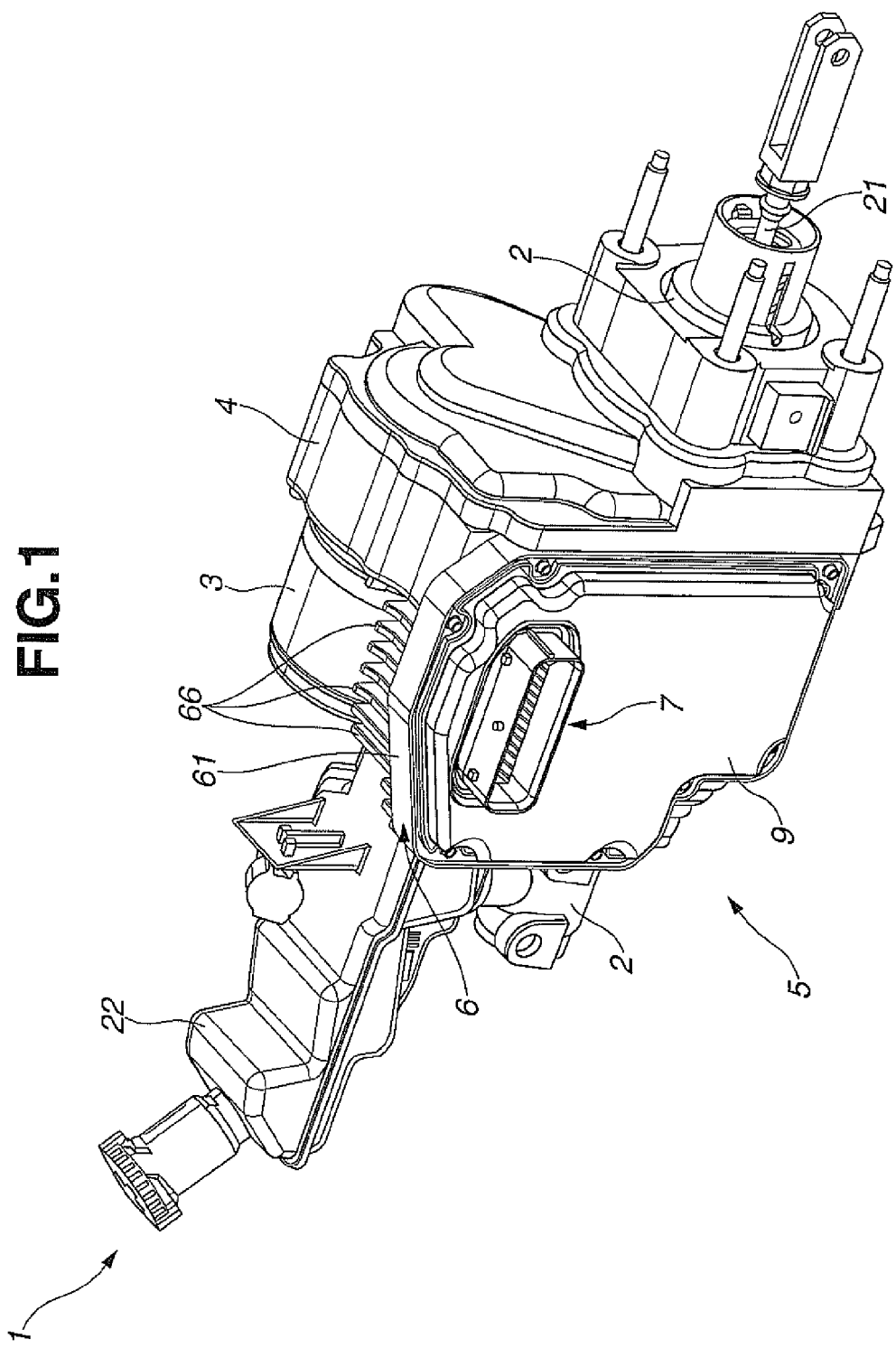
FIG. 1 is a perspective view of a brake control apparatus according to one embodiment of the present invention.

As shown in FIG. 1, a brake control apparatus for an automotive vehicle according to one embodiment of the present invention includes a master cylinder 2 that generates a hydraulic braking pressure by a piston thereof in response to operation of a brake pedal of the vehicle, an electric motor 3 that drives the master cylinder 2, a housing 4 in which the master cylinder 2 and the electric motor 3 are assembled and a control unit 5 combined with the housing 4 and adapted to perform drive control of the electric motor 3.

In the present embodiment, the master cylinder 2 and the electric motor 3 are arranged not to be coaxial with each other (that is, the master cylinder 2 and the electric motor 3 are in a biaxial arrangement) in the housing 4. The housing 4 has incorporated therein a known movement conversion mechanism for, when a rotor of the electric motor 3 is actuated upon depression of the brake pedal, converting rotational movement of the rotor of the electric motor 3 to linear axial movement of the piston of the master cylinder 2 although not specifically shown in the drawing.

An input rod 21 is connected to the piston in the master cylinder 2 and led out from one end of the master cylinder 2. The master cylinder 2 includes a hydraulic pressure tank 22 for storing therein a brake fluid so as to fill the master cylinder 2 with the brake fluid, an instrument piping system (not shown) for monitoring the inside pressure of the master cylinder 2 and a brake piping system (not shown) for discharging the hydraulic braking pressure generated by movement of the piston (i.e. the pressure of the brake fluid).

The structure of the control unit 5 will be now explained below in detail.

Figure 2:
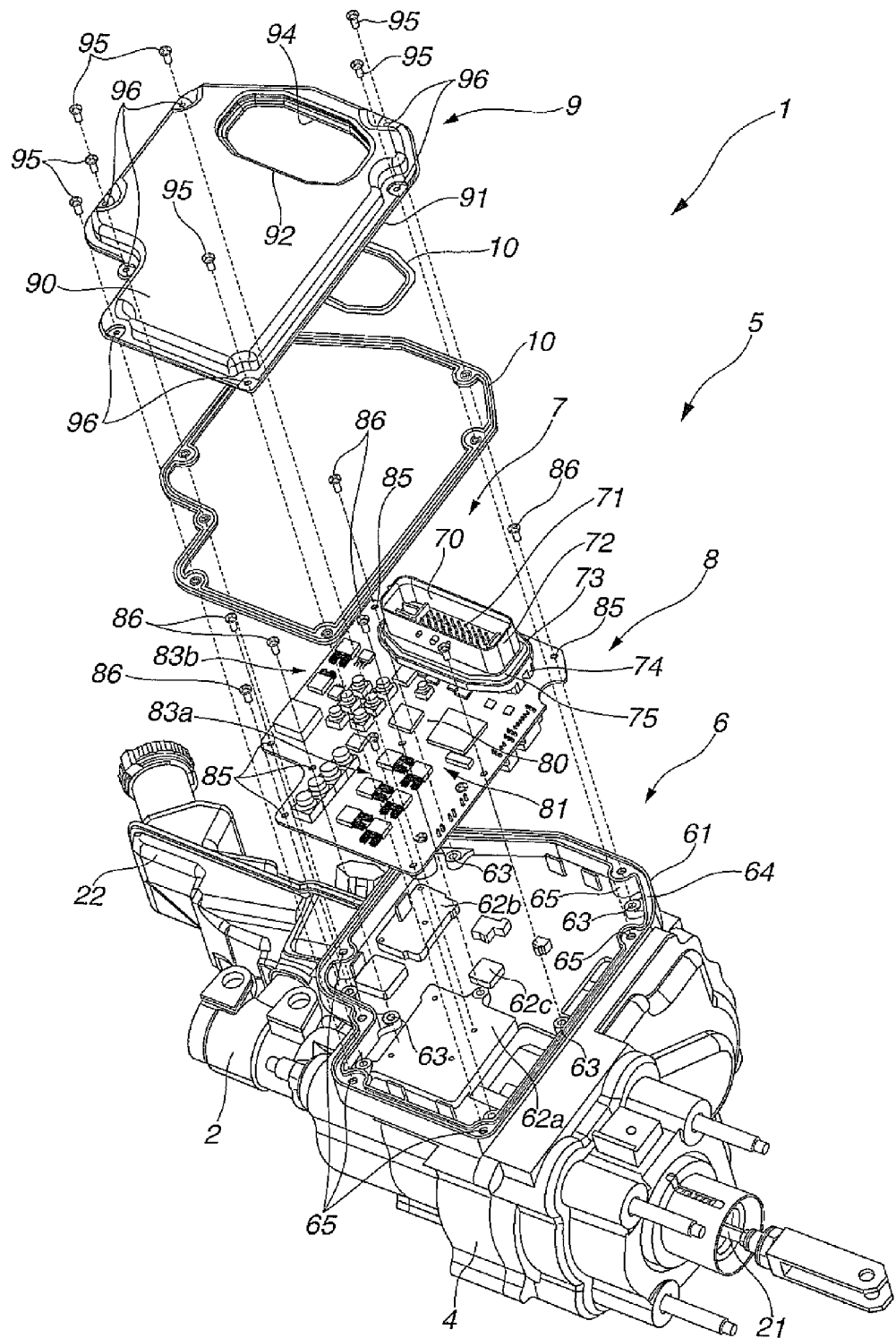
FIG. 2 is an exploded perspective view of the brake control apparatus of FIG. 1.

As shown in FIG. 2, the control unit 5 includes a circuit board 8, a box-shaped case 6 (as a casing member) accommodating therein the circuit board 8 and a cover 9 (as a cover member) sealing the case 6.

Figure 3:
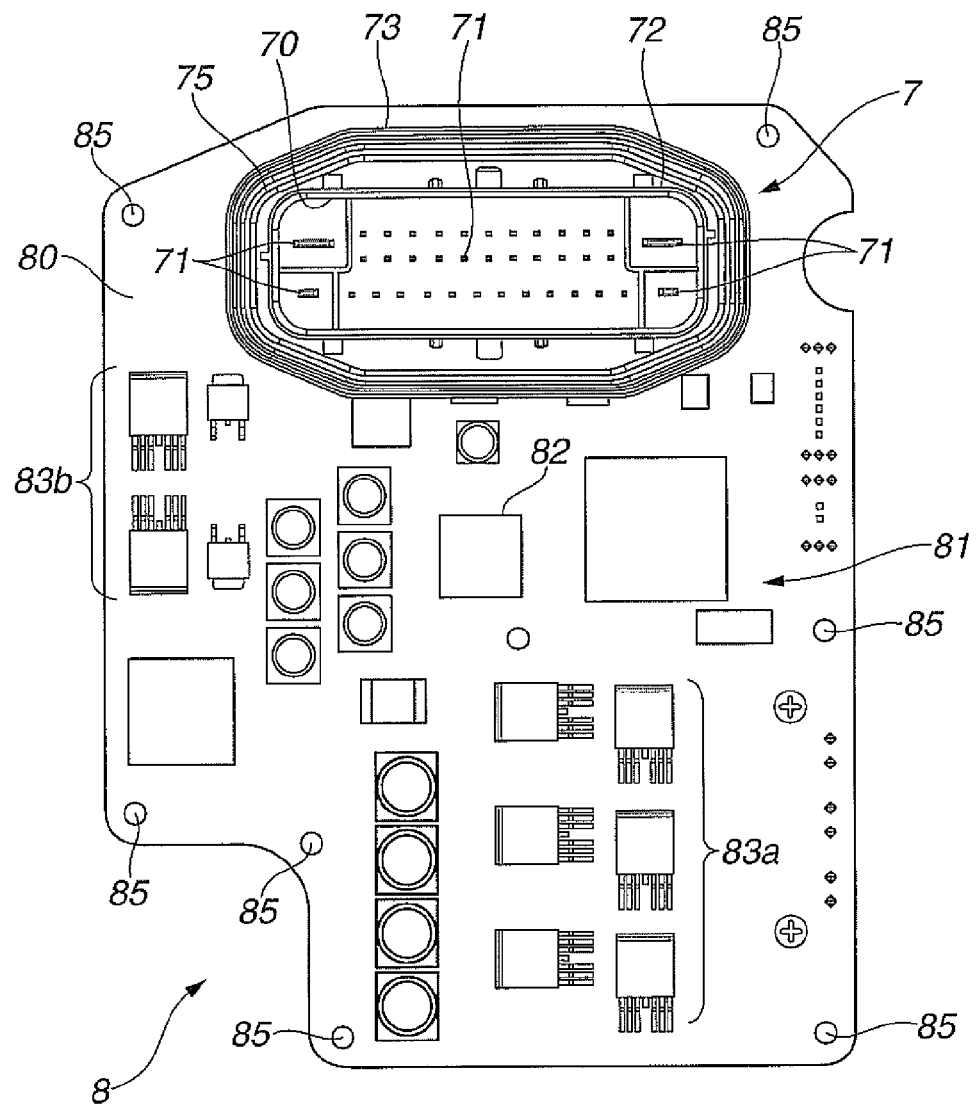
FIG. 3 is a plan view of a circuit board of a control unit of the brake control apparatus of FIG. 1.
Figure 4:
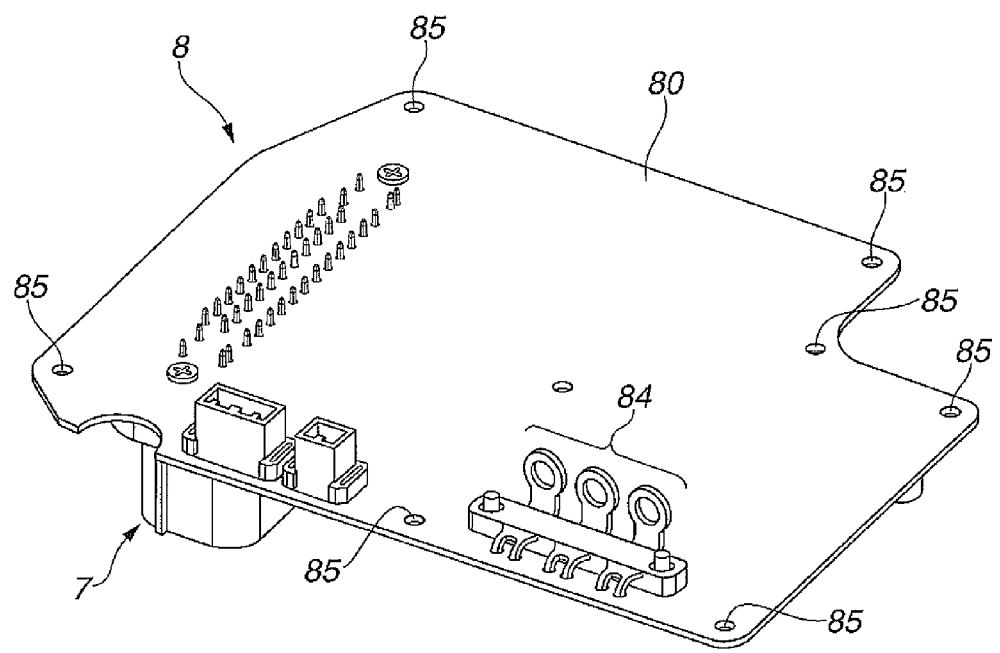
FIG. 4 is a perspective view of a back side of the circuit board of FIG. 3.

The circuit board 8 has a thin plate-shaped substrate made of a synthetic resin material, a main circuit block 81 mounted on one surface 80 (hereinafter referred to as "mounting surface") of the substrate and an energization terminal 84 mounted on the other surface of the substrate as shown in FIGS. 3 and 4.

The main circuit block 81 includes at least a controller 82 (such as a microcomputer) that outputs a control signal to the electric motor 3 and drive elements 83a and 83b that output a drive signal to the energization terminal 84 according to the control signal. Upon receipt of the drive signal from the drive elements 83a and 83b, the energization terminal 84 transmits the drive signal to the electric motor 3. Namely, the main circuit block 81 serves as an inverter circuit for the electric motor 3.

Further, a relay with a MOSFET, a shunt resistor, a common mode coil, a normal mode coil, an electrolytic condenser and the like are mounted on the mounting surface 80 of the substrate as components of a filter electronic circuit and are electrically conducted with the main circuit block 81.

A plurality of fixing holes 85 are formed in a circumferential edge part of the substrate of the circuit board 8 at appropriate intervals so as to allow insertion of fixing members 86 into the respective fixing holes 85 for fixing of the circuit board 8 in the case 6.

Figure 8:
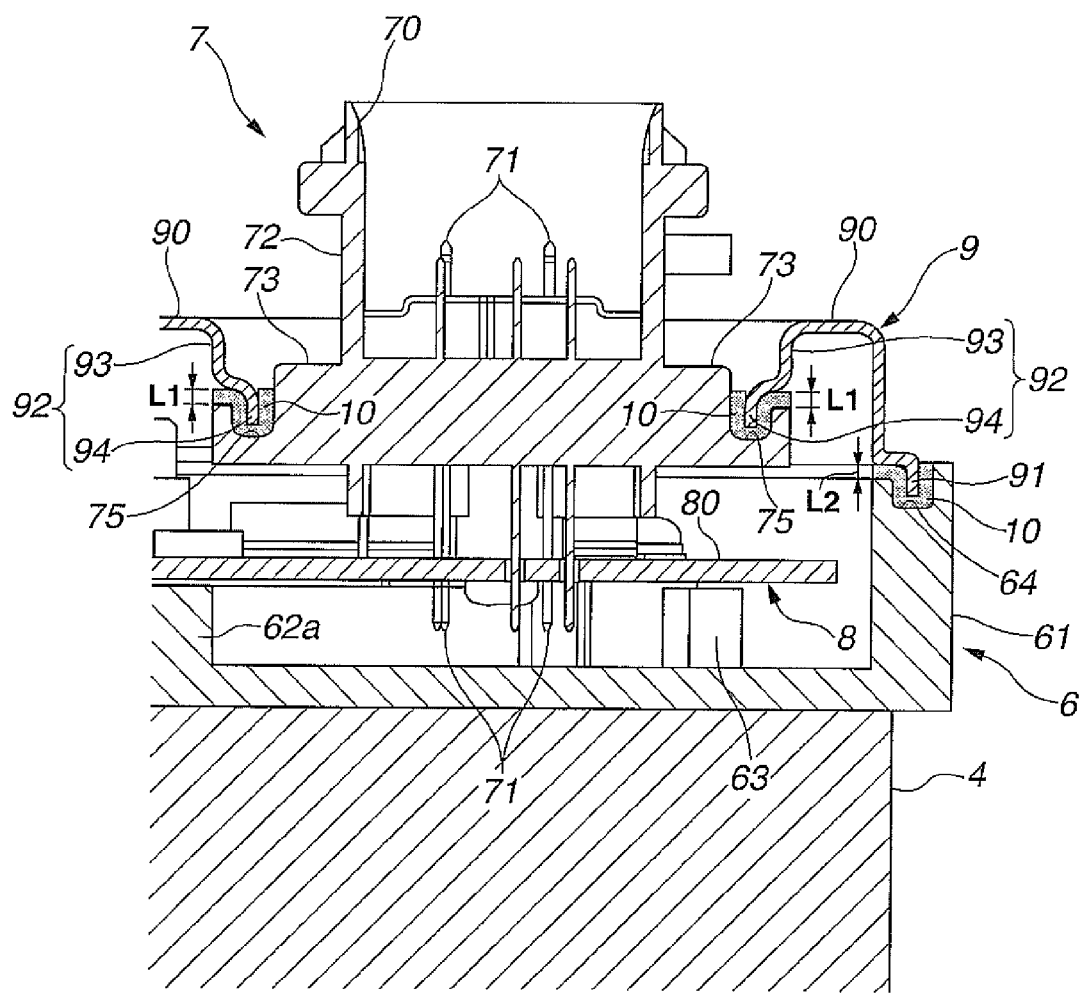
FIG. 8 is a cross-section view of the vicinity of a connector of the control unit of FIG. 3.

The circuit board 8 also has a connector 7 mounted on the mounting surface 80 of the substrate as shown in FIGS. 1, 2 and 8.

The connector 7 includes a connection terminal 71 that electrically connects the main circuit block 8 of the circuit board 8 to external equipment (not shown), a connector body 72 that accommodates and supports therein the connection terminal 71 with one end of the connection terminal 71 being exposed through an opening 70 of the connector body 72, a flange portion 73 formed integral with a bottom-side outer circumferential surface of the connector body 72 and a support portion 74 formed integral with the connector body 72 and the flange portion 73 so as to support the connector body 72 and the flange portion 73 on the circuit board 8.

A sealing groove 75 is formed in the flange portion 73 of the connector 7 so as to allow insertion of a protruding portion 94 of the cover 9 into the sealing groove 75.

At the time of insertion of the protruding portion 94 in the sealing groove 75, the sealing groove 75 is filled with a sealant 10. There is no particular limitation on the kind of the sealant 10 as long as the sealant 10 has fluidity. Examples of the sealant 10 are epoxy sealing materials, silicone sealing material, acrylic sealing material and the like. The sealant 10 can be selected as appropriate depending on the performance specifications of the brake control apparatus 1. The sealing groove 75 is not necessarily filled up with the sealant 10. It suffices to fill the sealing groove 75 with the sealant 10 in such a manner that, when the protruding portion 94 is inserted into the sealant 10 within the sealing groove 75, the amount of the sealant 10 extruded out by insertion of the protruding portion 94 is enough to fill a clearance L1 as shown in FIG. 8.

For improvement of the accuracy of attachment of the cover 9 to the case 6, a guide portion may be formed integral with the sealing groove 75 so as to guide the protruding portion 94 to the vicinity of a center of the sealing groove 75 in a width direction.

The case 6 has a box-shaped case body 61 formed at least partially integral with the housing 4 and defining therein a space for accommodation of the circuit board 8. In the present embodiment, the case body 61 has a bottom, a part of which is combined and formed integral with the housing 4 and another part 6A of which is left uncombined with the housing 4, as shown in FIG. 5.

As shown in FIGS. 1 and 5 to 7, a plurality of plate-shaped heat radiating fins 66 are formed on an outer surface (motor-side surface) of the uncombined part 6A of the case body 61 so as to extend toward the electric motor 3.

Figure 5:
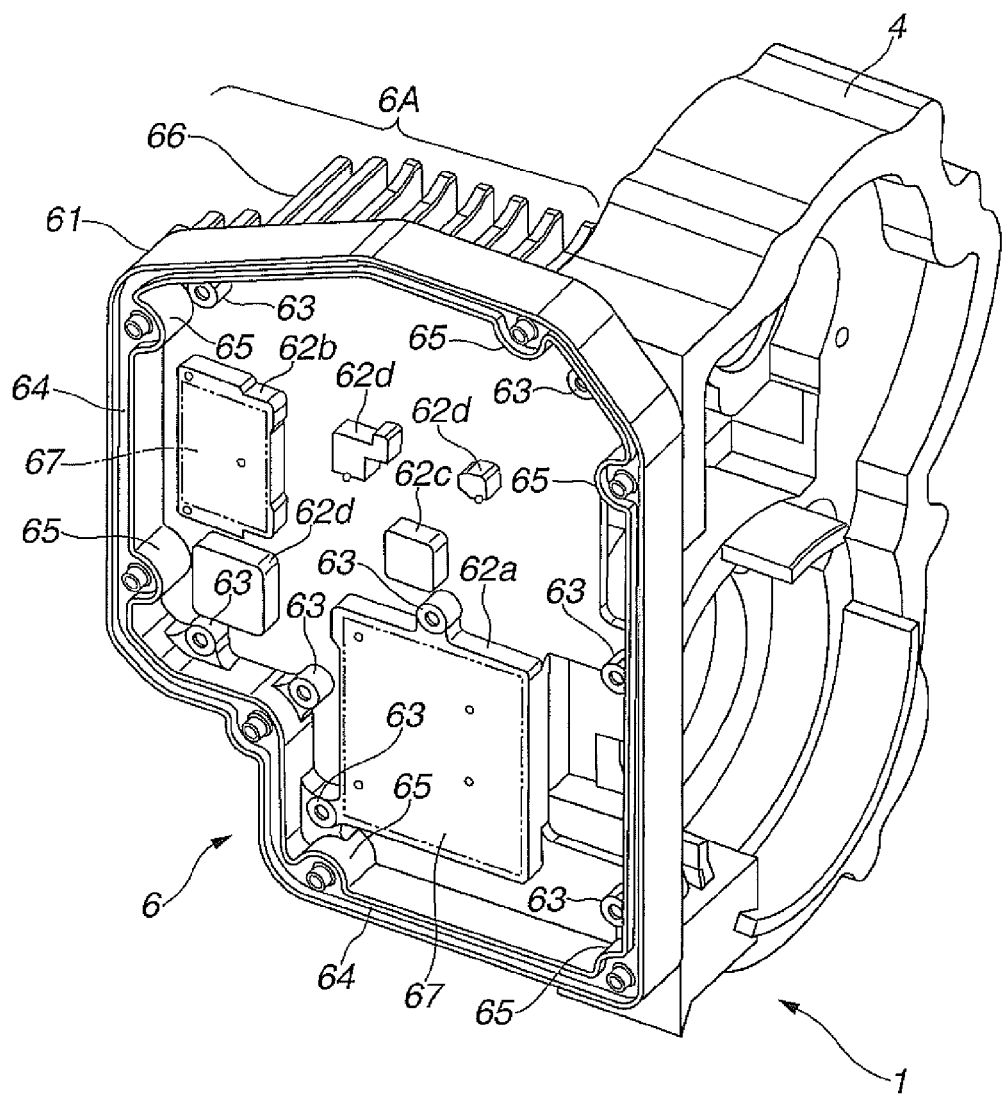
FIG. 5 is a perspective view of a housing of the brake control apparatus of FIG. 1 in a state where a cover of the control unit is detached.
Figure 6:
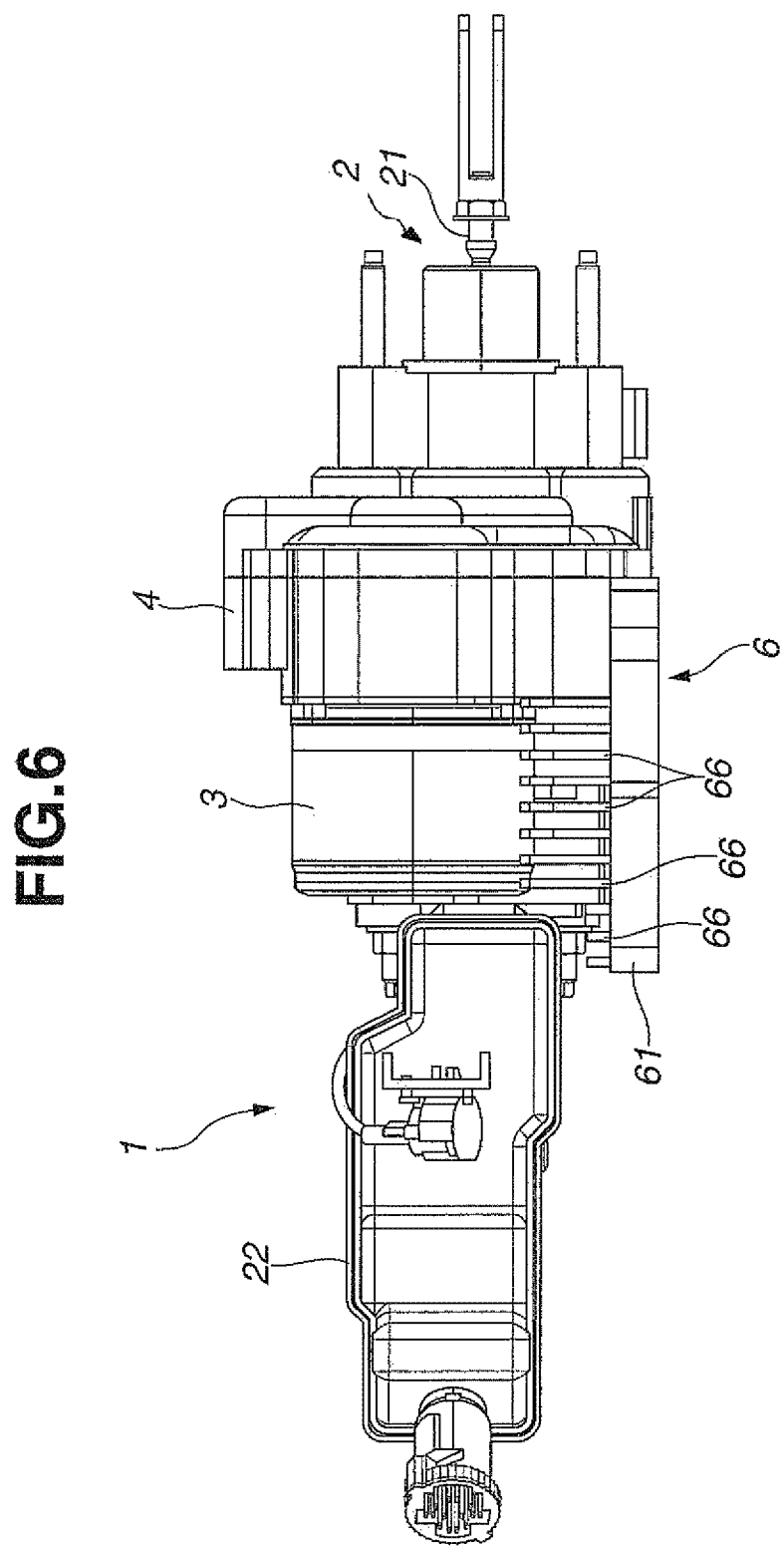
FIG. 6 is a top view of the brake control apparatus of FIG. 1.
Figure 7:
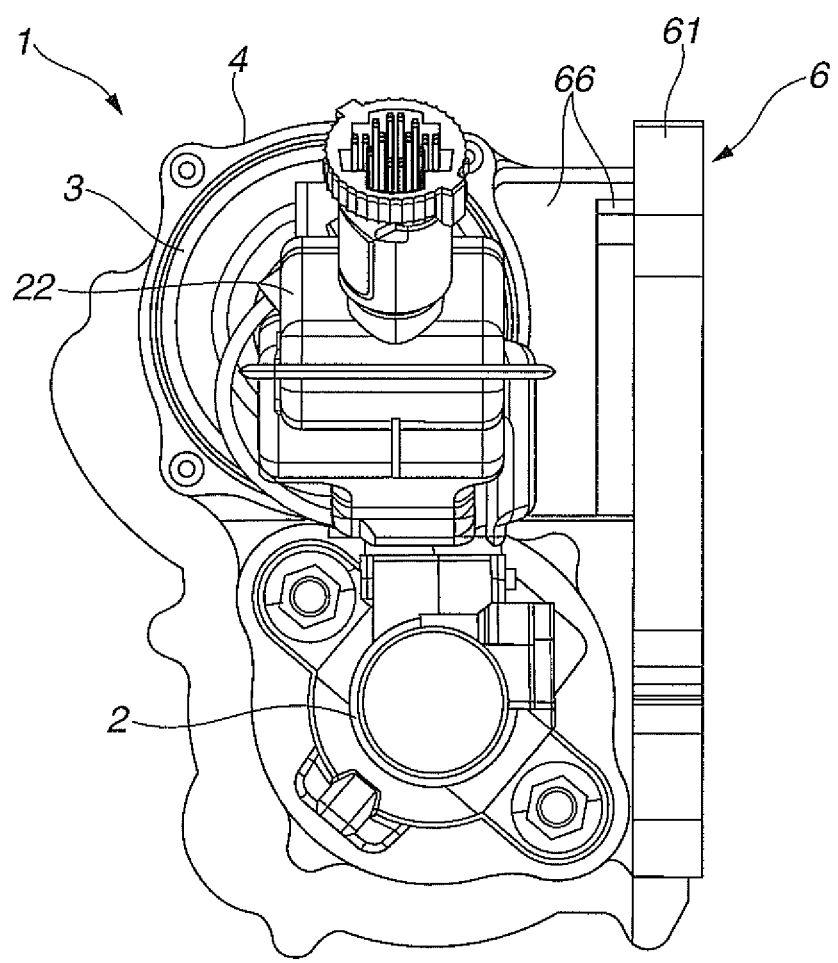
FIG. 7 is a front view of the brake control apparatus of FIG. 1.

In the present embodiment, heat radiating seats 62a to 62c of varying sizes are formed protrudingly on an inner surface of the bottom of the case body 61 so as to correspond in position to the high-heat-generating circuit components (such as controller 82, drive elements 83a and 83b and filter electronic circuit components) of the circuit board 8 as shown in FIGS. 2 and 5 and thereby release heat of these circuit components toward the housing 4.

The heat radiating seat 62a is formed integral with the inner bottom surface of the case body 61 at a position apart from the electric motor 3 and closer to the master cylinder 2 than the electric motor 3 (i.e. adjacent to an axis of the master cylinder 2). In the state where the circuit board 8 is accommodated in the case 6, the heat radiating seat 82a is brought into thermal contact with the circuit board 8 so as to radiate heat of the drive elements 83a toward the housing 4.

The heat radiating seat 62b is made smaller in size (volume) than the heat radiating seat 62a and is formed integral with the inner bottom surface of the case body 61 at a position corresponding to the uncombined part 6A of the case 6. In the state where the circuit board 8 is accommodated in the case 6, the heat radiating seat 62b is brought into thermal contact with the circuit board 8 so as to radiate heat of the drive elements 83b toward the heat radiating fins 66.

The heat radiating seat 62c is made smaller in size (volume) than the heat radiating seat 62b and is formed integral with the inner bottom surface of the case body 61 at a position adjacent to the heat radiating seat 62a. In the state where the circuit board 8 is accommodated in the case 6, the heat radiating seat 62c is brought into thermal contact with the circuit board 8 so as to radiate heat of the controller 82 to the housing 4.

A plurality of fixing portions 63 are formed protrudingly in the vicinities corners of the inner bottom surface of the case body 61 such that the circuit board 8 is fixed in the case 6 by screwing the fixing members 86 of the circuit board 8 into the respective fixing portions 63. A plurality of fixing portions 65 are also formed protrudingly in the vicinities of the corners of the case body 61 for fixing of the cover 9 to the case 6.

A sealing groove 64 is formed in a circumferential edge part of the case body 61 so as to allow insertion of a protruding portion 91 of the cover 9 into the sealing groove 64.

As in the case of the sealing groove 75, the sealing groove 64 is filled with a sealant 10 at the time of insertion of the protruding portion 91 in the sealing groove 64. The sealant 10 used herein can be the same as mentioned above. The sealing groove 64 is not necessarily filled up with the sealant 10. It suffices to fill the sealing groove 84 with the sealant 10 in such a manner that, when the protruding portion 91 is inserted into the sealing material 10 within the sealing groove 64, the amount of the sealant 10 extruded out by insertion of the protruding portion 91 is enough to fill a clearance L2 as shown in FIG. 8.

It is noted that, in the present embodiment, the height of the fixing portions 63 is set such that, in the state where the circuit board 8 is properly fixed to the fixing portions 63 in the case 6, the sealing groove 75 of the connector 7 is located at a higher position than the sealing groove 64 of the case 6.

As shown in FIG. 5, heat radiating members 67 are arranged on the heat radiating seats 62a and 62b, respectively. There is no particular limitation on the heat radiating member 67 as long as the heat radiating member 67 has heat conduction properties. The heat radiating member 67 is not limited to sheet form. There can be applied a known heat radiating material such as heat radiating grease, heat conductive adhesive typified by heat radiating adhesive, or the like.

The cover 9 includes a box-shaped cover body 91 formed of a metal material or resin material so as to close an opening of the case 6 in which the circuit board 8 is accommodated as shown in FIG. 1. Herein, the cover 9 can be reduced in production cost and weight by the application of a resin material. The above-mentioned protruding portion 91 is formed around a circumferential edge part of the cover body 91 so as to protrude downward and engage in the sealing groove 64 of the case 64.

The cover body 91 has, formed in a top lid thereof, a window portion 92 through which the connector body 72 of the connector 7 pass. As shown in FIG. 8, the window portion 92 includes a window frame 93 protruding downward from a lower surface of the top lid of the cover body 91. The above-mentioned protruding portion 94 is formed integral with and around a circumferential edge part of the window frame 93 so as to protrude downward and engage in the sealing groove 75 of the connector 7.

It is noted that the distance from the lower surface of the top lid of the cover body 91 to a distal end of the protruding portion 94 is set smaller than the distance from the lower surface of the top lid of the cover body 91 to a distal end of the protruding portion 91 in accordance with the difference in height position between the sealing groove 75 of the connector 7 and the sealing groove 64 of the case 6 in the assembled state of the control unit 5.

As shown in FIG. 2, a plurality of fixing holes 96 are formed in corners of the circumferential edge part of the cover body 90 such that the cover 9 is fixed to the case 6 by inserting fixing members 95 in the fixing holes 96 and screwing these fixing members 95 into the respective fixing portions 65 of the case 6.

One example of the assembling method of the control unit 5 will be next explained below with reference to FIGS. 2, 5 and 8.

After the heat radiating members 67 are adhered or applied to the heat radiating seats 62a and 62b of the case 6, the circuit board 8 is placed on the fixing portions 63 of the case 6. Then, the fixing members 86 are inserted through the fixing holes 85 of the circuit board 8 and screwed into the fixing portions 63 of the case 6. At this time, the opening of the accommodation space of the case 6, the opening of the sealing groove 64 of the case 6 and the opening of the sealing groove 75 of the connector 7 are directed to the same direction.

Subsequently, the sealing groove 64 of the case and the sealing groove 75 of the connector 7 are filled with the sealant 10.

The cover 9 is then attached to the case 6 by inserting the protruding portions 91 and 94 of the cover 9 in the sealing groove 64 of the case 6 and the sealing groove 75 of the connector 7, respectively, while allowing the connector body 72 of the connector 7 to pass through the window portion 92 of the cover 9.

Before the insertion of the protruding portion 91 into the sealing groove 64, the protruding portion 94 is inserted into the sealing groove 75 as shown in FIG. 8. This enables proper horizontal positioning of the cover 9 relative to the case 6 so as to guide the distal end of the protruding portion 91 to the vicinity of a center of the sealing groove 64 in a width direction.

When the cover 9 is pushed onto the case 6, the protruding portions 91 and 94 of the cover 9 are respectively embedded in the sealant 10 within the sealing grooves 64 of the case 6 and the sealing groove 75 of the connector 7. When the cover 9 is further pushed onto the case 6, the sealant 10 is extruded out by insertion of the protruding portions 91 and 94 into the sealing grooves 64 and 75 to fill the clearances L1 and L2 as shown in FIG. 8 and thereby establish gas tightness and fluid tightness between the circumferential edge parts of the case 6 and the cover 9 and between the circumferential edge parts of the connector 7 and the cover 9 (window portion 92).

In this way, the cover 9 is fixed to the case 6 after the filling of the sealing groove 64 of the case 6 and the sealing groove 75 of the connector 7 with the sealant 10.

After that, the fixing members 95 are inserted through the fixing holes 96 of the cover 9 and screwed into the fixing portions 65 of the case 6.

When the sealant 10 is cured after the lapse of a predetermined time, the case 6 and cover 9 are completely fixed together. By this, the assembling of the control unit 5 is completed.

In the completed assembled state, the circuit board 8 is in thermal contact with the heat radiating seats 62a to 62c through the heat radiating members 67 so that heat of high-heat-generating circuit components such as controller 82 and drive elements 83a and 83b can be efficiently released toward the housing 4.

There is a possibility that the top lid of the cover 9 vibrates vertically during operation of the electric motor 3. However, the elastic sealant 10 is disposed between the cover and the connector 7 and between the cover 9 and the case 6 as shown in FIG. 8. Such vibrations can be absorbed by the elastic sealant 10 so as not to exert an adverse influence on the drive elements 83a and 83b etc.

As described above, it is possible to improve the heat radiation performance and vibration resistance of the control unit 5 while downsizing the brake control apparatus 1.

In the present embodiment, the heat radiating seats 62a to 62c are located on the side of the housing 4 so that the housing 4 can be utilized as a heat mass. This leads to downsizing of the heat radiating fins 66 and, by extension, overall downsizing of the brake control apparatus 1.

Further, the drive elements 83a and 83b of the circuit board 8 are in thermal contact with the housing 4 through the heat radiating seats 62a and 62b at the positions apart from the electric motor 3 and close to the master cylinder 2 within the control unit 5. More specifically, the heat radiating seat 62a is located adjacent to the axis of the master cylinder 2; the heat radiating seat 62b of smaller volume than the heat radiating seat 62a is located corresponding in position to the uncombined part 6A of the case 6; and the heat radiating fins 66 are arranged in the dead space between the electric motor 3 and the motor-side surface of the uncombined part 6A of the case 6 in the present embodiment. This makes it possible to prevent the drive elements 83a and 83b from being influenced by vibrations from the electric motor 3 and, at the same time, efficiently release heat of the drive elements 83a to the housing 4 and release heat of the drive elements 83b to the dead space between the electric motor 3 and the case 6 through the heat radiating fins 66. In addition, the arrangement of the heat radiating fins 66 in the dead space between the electric motor 3 and the case 6 is effective in preventing upsizing of the brake control apparatus 1.

Furthermore, the above arrangement of the heat radiating seats 62a and 62b allows radiation of heat from the high-heat-value drive elements 83a toward the high-heat-capacity master cylinder 2, while allowing radiation of heat from the other drive elements 83b to the outside of the case 6 through the heat radiating fins 66, so as to reduce the total capacity of the heat radiating seats 62a and 62b. In the present embodiment, the heat radiating seat 62c is also located adjacent to the heat radiating seat 62a so as to radiate heat of the controller 82 toward the housing 4. This distributed arrangement of the heat radiation sites is effective in preventing thermal interference and improving the heat radiation performance of the control unit 5.

In particular, the heat radiating seat 62a of larger volume than the heat radiating seat 62b is located adjacent to the axis of the master cylinder 2, i.e., the mounting point of the master cylinder 2 on the vehicle); and the heat radiating fins 66 are arranged adjacent to the mounting point of the master cylinder 2 as mentioned above in the present embodiment. This makes it possible to effectively reduce the velocity of vibrations caused by operation of the electric motor 3 and suppress these vibrations. By this vibration suppression, the metal or resin cover 9 can be utilized for reductions in weight and cost.

As the heat radiating seat 62b is formed integral with the bottom surface of the uncombined part 6A of the case 6, the heat radiating seat 62b can perform the function of a rib and reinforce the uncombined part 6A of the case 6.

It is feasible to bond the heat radiating seats 62a to 62c and the circuit board 8 together by a heat conductive adhesive so as to secure heat radiating path from the circuit board 8 to the heat radiating seats 62a to 62c. The adhesive bonding of the heat radiating seats 62a to 62c to the circuit board 8 is also effective in improving the fixability of the circuit board 8 and preventing the occurrence of warpage of the circuit board 8. Moreover, the number of the fixing members 86 of the circuit board 8 can be effectively reduced when the heat radiation seats 62a to 62c are adhesive bonded in the above distributed arrangement.

The entire contents of Japanese Patent Application No. 2013-194163 (filed on Sep. 19, 2013) are herein incorporated by reference.

Although the present invention has been described with reference to the above exemplary embodiment, the present invention is not limited to the above exemplary embodiment. Various modification and variation of the embodiment described above will occur to those skilled in the art in light of the above teachings. The scope of the present invention is defined with reference to the following claims.

What is claimed is:

1. A brake control apparatus, comprising:
   a master cylinder that generates a hydraulic braking pressure in response to operation of a brake pedal;
   an electric motor that drives the master cylinder;
   a housing in which the master cylinder and the electric motor are assembled; and
   a control unit adapted to perform drive control of the electric motor, wherein
      the master cylinder and the electric motor are arranged to be noncoaxial relative to one another;
      the control unit comprises
         a case member having a bottom formed at least partially integral with the housing and facing the master cylinder and the electric motor, and
         a circuit board accommodated in the case and mounting thereon circuit components including a controller configured to output a control signal to the electric motor, drive elements configured to drive the electric motor and filter circuit elements, and
      the brake control apparatus comprises a first heat radiating seat protruding from an inner surface of the bottom of the casing member of the control unit at a position corresponding to the circuit components such that the first heat radiating seat is located apart from the electric motor and closer to the master cylinder than the electric motor and brought into thermal contact with the circuit board so as to radiate heat of the drive elements toward the housing.

2. The brake control apparatus according to claim 1, wherein
   the control unit comprises a cover member sealing the casing member;
   the bottom of the casing member of the control unit includes a part being uncombined with the housing; and
   the brake control apparatus comprises a heat radiating fin formed protrudingly on a motor-side surface of the uncombined part.

3. The brake control apparatus according to claim 1, wherein
   the control unit comprises a cover member sealing the casing member;
   the bottom of the casing member of the control unit includes a part being uncombined with the housing; and
   the brake control apparatus comprises another heat radiating seat being smaller in volume than the first heat radiating seat and located on the inner surface of the bottom of the casing member of the control unit at a position corresponding to the uncombined part.

4. The brake control apparatus according to claim 3, wherein the another heat radiating seat is formed integral with the inner surface of the bottom of the casing member of the control unit at the position corresponding to the uncombined part.

5. The brake control apparatus according to claim 3, wherein
   the uncombined part faces the electric motor; and
   the brake control apparatus comprises a heat radiating fin formed protrudingly on a motor-side surface of the uncombined part.

6. The brake control apparatus according to claim 1, wherein the circuit board and the first heat radiating seat are bonded together by a heat conductive adhesive.

\* \* \* \* \*